United States Patent [19]

Rumsey et al.

[11] Patent Number: 4,659,149
[45] Date of Patent: Apr. 21, 1987

[54] CROSS BLENDING ELECTRO-DYNAMIC/FRICTION BRAKE SYSTEM FOR MULTI-CAR TRAIN CONSIST HAVING MIXED POWER AND NON-POWER CARS

[75] Inventors: Steven C. Rumsey, No. Huntingdon; John R. Reiss, No. Versailles; Wayne P. Cymbor, No. Huntingdon, all of Pa.

[73] Assignee: American Standard Inc., Wilmerding, Pa.

[21] Appl. No.: 796,670

[22] Filed: Nov. 8, 1985

[51] Int. Cl.⁴ ............................................. B60T 13/74
[52] U.S. Cl. ...................................... 303/3; 188/159; 303/15
[58] Field of Search ................... 303/3, 15, 16, 17, 20; 188/155, 156, 159, 160

[56] References Cited

U.S. PATENT DOCUMENTS

| | | | |
|---|---|---|---|
| 3,944,287 | 3/1976 | Nagase | 303/3 X |
| 4,045,093 | 8/1977 | Bridigum | 303/3 |
| 4,073,541 | 2/1978 | Nagase | 303/3 |
| 4,270,806 | 6/1981 | Venkataperumal et al. | 188/159 X |

FOREIGN PATENT DOCUMENTS 57-17218 9/1983 Japan .
59-13440 6/1984 Japan .

OTHER PUBLICATIONS

Nippon Air Brake Co.–Document #1046-45138-73-00E.

Primary Examiner—Duane A. Reger
Assistant Examiner—Matthew C. Graham
Attorney, Agent, or Firm—G. J. Falce

[57] ABSTRACT

A cross blending brake system for a multi-car train having power cars that provide regenerative braking through the electro-dynamic action of the car's traction motors, as well as friction braking through an electric/friction brake blending valve, and non-power cars that provide friction braking only through an electric/friction brake blending valve. Since the regenerative brake effort on the power cars is limited only by the available wheel to rail adhesion on these cars, the regenerative action of the electro-dynamic brake provides brake effort in excess of the power car brake requirement, thus reducing the friction brake requirement of the non-power cars, which is limited by the lower threshold energy absorption ability of the wheels. The cross blending control utilizes the excess power car regenerative braking to avoid overheated wheels, while at the same time realizing a net energy savings and reduced brake shoe wear, particularly at maximum levels of regeneration.

13 Claims, 15 Drawing Figures

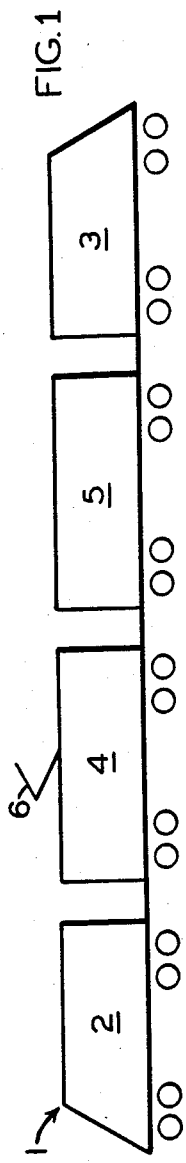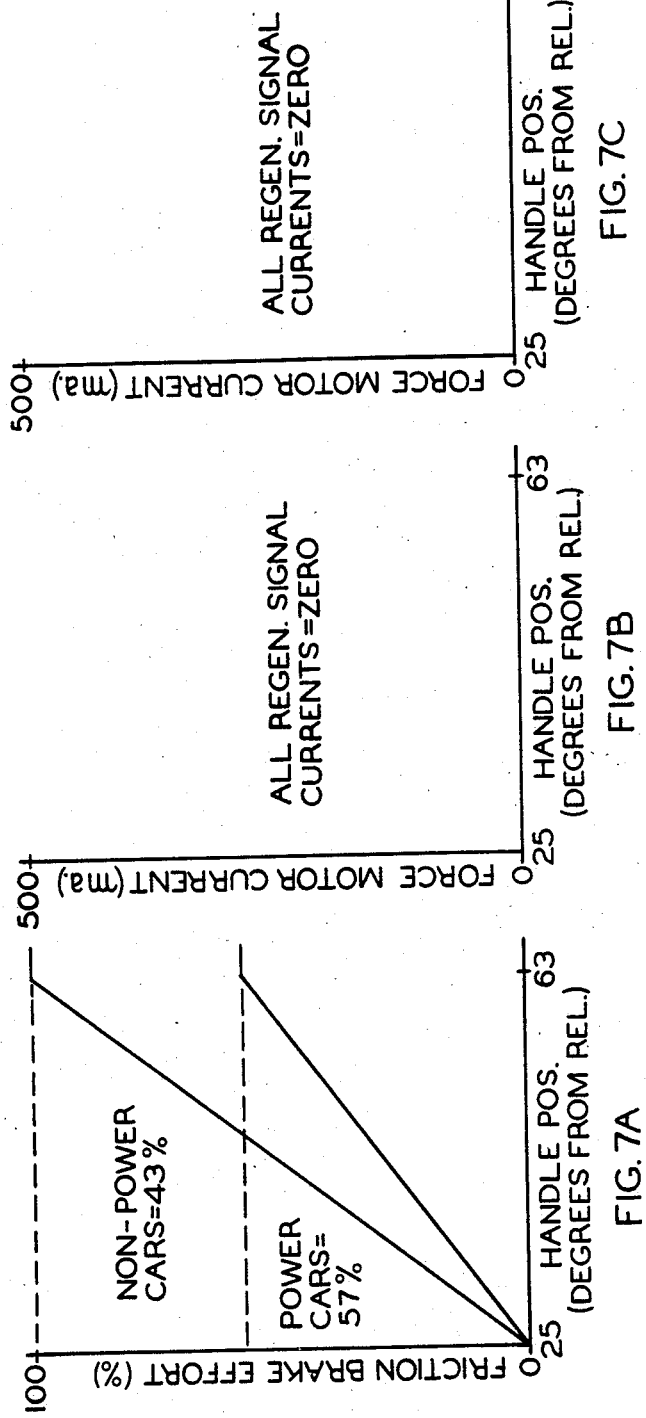

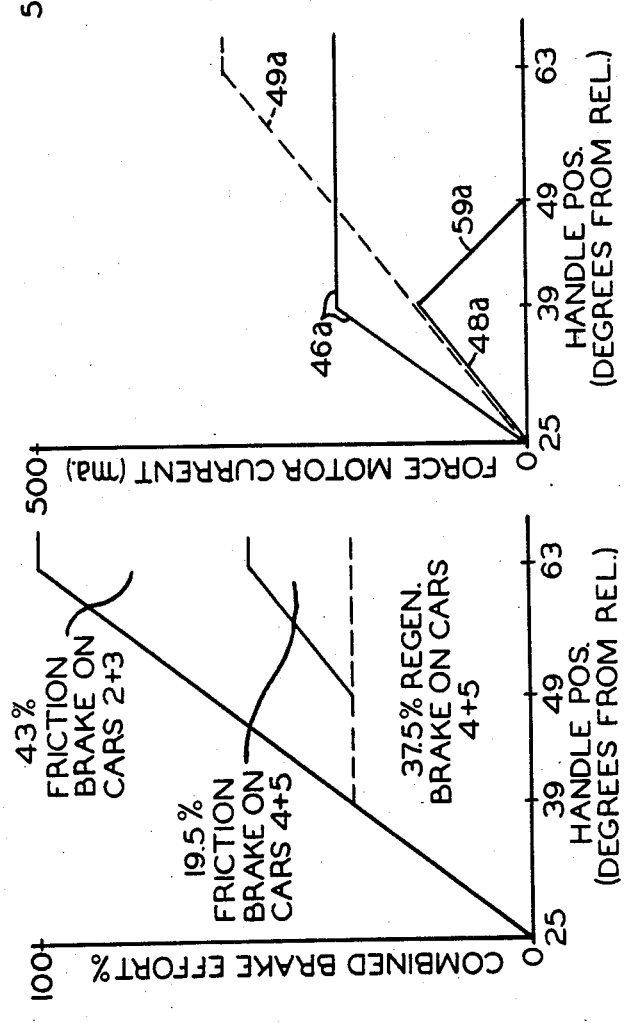

4,659,149

CROSS BLENDING ELECTRO-DYNAMIC/FRICTION BRAKE SYSTEM FOR MULTI-CAR TRAIN CONSIST HAVING MIXED POWER AND NON-POWER CARS

BACKGROUND OF THE INVENTION

The present invention is related to combined electro-dynamic and friction brake systems and, in particular, to such brake systems for trains consisting of both powered and non-powered cars.

Combining electro-dynamic and friction braking is known as brake blending and is employed as a means of supplementing the electro-dynamic brake with friction braking as the electro-dynamic brake effectiveness diminishes during the course of a train stop. In this sense, the friction brake must be designed to provide 100% of the brake requirement in the absence of any electro-dynamic braking, with varying amounts of friction braking being provided in proportion to diminished electro-dynamic brake effect, so that the total brake effort of the combined electro-dynamic and friction braking satisfies the total braking requirement. Blending the electro-dynamic and friction brakes in this manner is known as direct brake blending.

Since the maximum electro-dynamic and friction brake levels are necessarily the same in direct brake blending systems, and the friction brake is limited by the allowable wheel temperature resulting from the friction between the brake shoes and wheel treads (where the friction brake is achieved through a conventional tread brake unit), it will be understood that this wheel temperature limiting factor also establishes the maximum level of electro-dynamic braking. Consequently, maximum utilization of the electro-dynamic brake capability, which is otherwise limited by the wheel/rail adhesion, is not achieved in direct brake blending systems, since generally the wheel temperature limitation establishes a greater restriction on the allowable brake effect than the wheel/rail adhesion limitation factor. This is of particular significance in train consists employing both power and non-power cars, where the power cars' electro-dynamic braking is a regenerative-type brake. The regenerative brake operates by dissipating the traction motor current generated during braking back into the power line via a catenary for use by other trains in the vicinity that are drawing current.

It will be apparent, therefore, that achieving less than maximum utilization of the regenerative capability of the electro-dynamic brake during retardation wastes available energy that could be put back into the power line, and further results in a high incidence of brake shoe wear due to excessive use of the pneumatic brake to supplement the electro-dynamic brake.

OBJECTS OF THE INVENTION

It is, therefore, an object of the invention to provide a blending system for a train consisting of both powered and non-powered cars, whereby maximum utilization of the regenerative ability of the electro-dynamic brake is obtained. Since the maximum ability of the electro-dynamic brake can be designed to exceed the maximum brake effort requirement of the power cars in cross blending systems, this excess can be used to provide a portion of the non-power car brake requirement.

It is another object of the invention to provide a blending system in accordance with the foregoing objective, which further maintains any given desired train retardation rate constant irrespective of changes in the effective regenerative ability of the electro-dynamic brake by supplementing with friction brake on the non-powered cars (up to a limit that will provide the train retardation rate on these cars) and on the powered cars, if required to achieve the train retardation rate.

It is still another object of the invention that when zero regenerative electro-dynamic brake effort is available, each car of the train will provide friction brake at a level required to brake the respective car at the specified train retardation rate.

Briefly, these objectives are achieved by cross-blending the electro-dynamic and friction brake between the several cars of the train. Cross-blending may be defined as a combination of electro-dynamic and friction braking such that the total individual car brake effort changes as a function of the regenerative capability of the electro-dynamic brake, with the total train brake effort remaining constant, for a desired brake demand. In the arrangement according to the present invention, therefore, the blended friction braking effort on each car in the train consist changes with the regenerative brake capability of the motor or power cars, without effecting the desired consist retardation rate.

During a brake application, the regenerative brake on the motor or power cars is operated to full potential prior to the addition of any supplemental friction brake on either the power or non-power cars. When the brake demand exceeds the available regenerative brake power, friction brake is initially applied on the non-power cars.

The maximum amount of friction brake capable of being added to the non-power cars is determined by the thermal limitations of the wheels for that particular car. As additional braking is required to meet the desired retardation of the train, friction braking is added to the power cars so that the combined electro-dynamic and friction brake effort on the power cars plus the friction brake effort on the non-power cars equals 100% of the requested retardation.

The cross blending brake control according to the present invention, optimizes regenerative brake utilization for more efficient use of energy and eliminates thermal wheel damage, while reducing brake shoe wear.

BRIEF DESCRIPTION OF THE DRAWINGS

The foregoing objects, features, and advantages will become better understood from the following more detailed explanation of the invention when taken in conjunction with the accompanying drawings in which:

FIG. 1 shows a multi-car train consist including two power cars and two non-power cars;

FIG. 6a is a graph showing how the total brake effort on the train of cars in FIG. 1 is apportioned between electro-dynamic and friction braking on the respective cars when a condition of 50% regenerative capability exists;

FIGS. 6b and 6c are graphs showing the relationship between the brake blending unit control signal excursion at the power and non-power cars at 50% regenerative capability under tare load and full load conditions, respectively;

FIG. 7a is a graph showing how the total brake effort is provided apportioning the friction braking between the respective cars in the absence of any regenerative braking capability; and FIGS. 7b and 7c are graphs indicating that, in the absence of any regenerative brake capability, the brake blending unit control signal is zero amps at the power and non-power cars under both tare and full load conditions.

DESCRIPTION AND OPERATION

Figure 2:
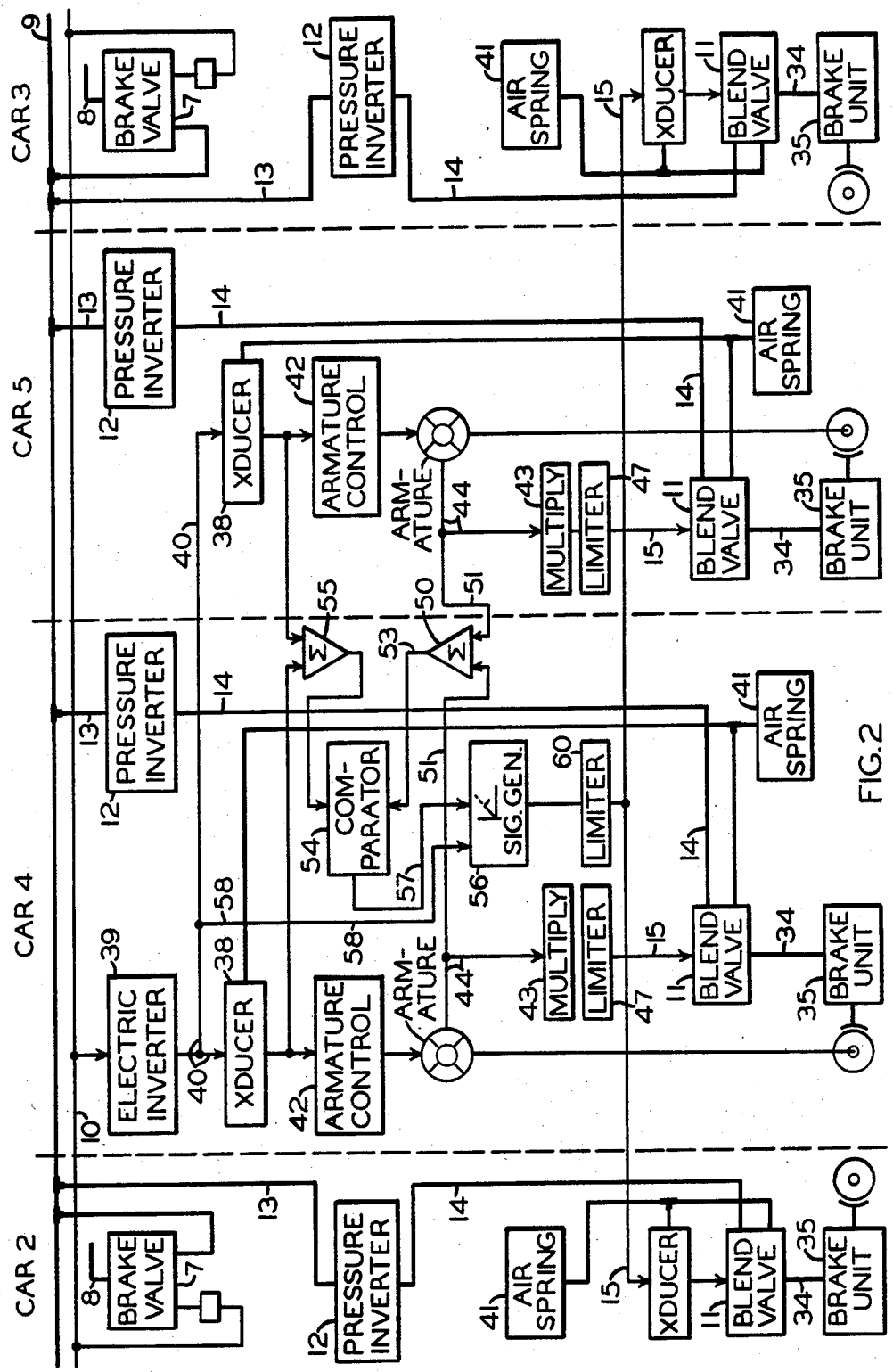
FIG. 2 is a block diagram of the cross blending brake system, according to the present invention, as arranged between the respective power and non-power cars shown in FIG. 1.

Referring now to FIG. 1, the invention will be explained with respect to a multi-car train 1 consisting of a trailer car 2 and 3 at opposite ends, which are non-powered in the sense that these cars have no traction motors to provide tractive effort for either propulsion or braking purposes, and intermediate cars 4 and 5 coupled between the trailer cars, which are powered in the sense that these cars do have traction motors. Power car 4 is provided with a catenary or pantograph 6 via which power may be supplied from overhead power lines to the traction motors on the respective power cars during a propulsion mode of operation, and via which power may be fed back into the power line during regeneration of the traction motors in a braking mode of operation. While a four-car module is shown and described, the invention is also suitable for use in a three- or two-car module wherein at least one car is powered and at least one car is non-powered.

As shown in FIG. 2, each non-powered trailer car 2 and 3, in the example shown, is a cab car in which propulsion and brake control equipment is located, including a combined pneumatic/electric brake controller 7, such as the conventional, well-known, 26-type Brake Valve manufactured by the Westinghouse Air Brake Company, but modified to generate an electrical analog current signal or alternatively a frequency signal that changes with movement of the controller handle 8 so as to vary in inverse proportion to the brake pipe pressure change effected by the controller 7. Such modification could be accomplished simply by arranging a rheostat, for example, on the brake controller handle shaft. Such arrangements have been disclosed previously, for example, in U.S. Pat. No. 3,709,564. Depending upon which cab car is controlling, movement of the brake controller handle 8 thereon into the service zone of brake application concurrently effects a proportional reduction of the fluid pressure in a brake pipe 9 that is coupled continuously through each car of the train and the control current in a signal wire 10 which also extends from brake controller 7 through each car of the train. The rheostat is arranged to effect an analog current signal change in signal wire 10 between 500–0 ma., as brake valve handle 8 is moved from full release position to full service position.

Figure 3:
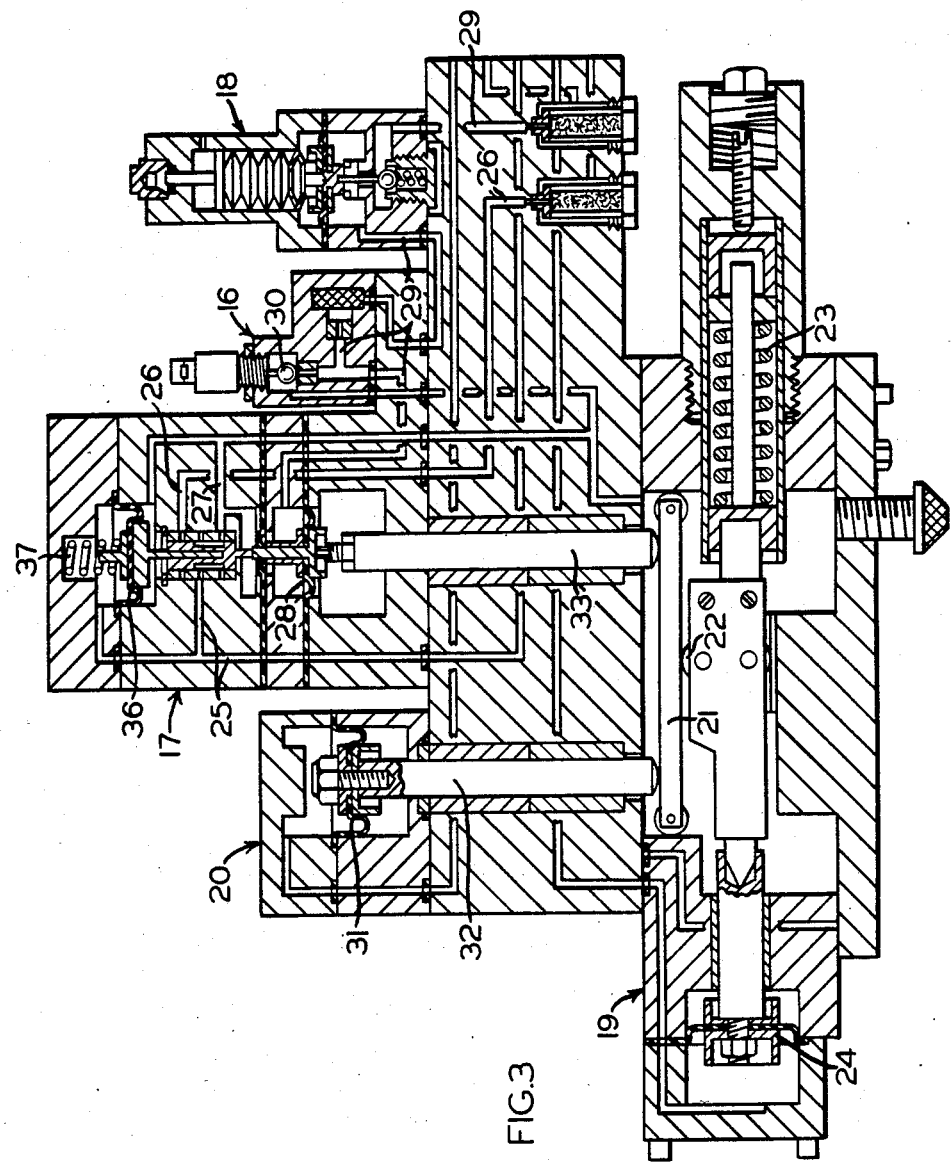
FIG. 3 is a diagrammatic drawing showing the brake blending unit which controls the friction brakes on the respective power and non-power cars shown in FIG. 1.

On each car of the train, there is provided a friction brake blending unit 11, such as a conventional, well-known A-1 SERVOTROL Valve, shown in FIG. 3, and a pneumatic pressure inverter 12, such as a conventional, well-known MC-30 Control Valve, both manufactured by the Westinghouse Air Brake Company. A branch pipe 13 on each car connects the air in brake pipe 9 to the control port of pressure inverter 12. The output of pressure inverter 12 is connected by a control pipe 14 to blending units 11 on each car, while a control wire 15 is connected to the blending unit force motor transducer 16 shown in FIG. 3. This control wire 15 at each car provides a control current signal to the respective car blending units, which is varied as shown in the graphs of FIGS. 4–7 in order to establish the respective car friction brake requirement through the respective blending units. Before proceeding with the explanation as to how the control current signal to the blending unit force motors is developed at the respective power and non-power cars, an explanation of the blending units 11 will be given, since a knowledge of the operation of this device is crucial to an understanding of the invention.

Each brake blending unit 11 is comprised of an A-1 SERVOTROL blending valve, as shown in FIG. 3, which includes the aforementioned force motor transducer 16, a self-lapping type relay valve 17, a pressure regulator 18, a load-responsive actuator 19, and a pneumatic brake actuator 20. The output force of actuator 20 is load-modulated through a balance beam 21, the fulcrum point of which is a movable roller 22 that is positioned in response to the counteracting forces of an adjustable spring 23 and a diaphragm piston 24 subject to the respective car air spring pressure. A delivery passage 25, a first supply passage 26 and an exhaust passage 27 are connected to the spool valve assembly of relay valve 17, which, in the neutral or lap position, blanks these passages. A diaphragm piston 28 is subject to pneumatic pressure supplied via a second supply passage 29 and pressure regulator 18 to force the relay valve 17 in a downward direction to release position in which the relay valve spool valve assembly connects delivery passage 25 to exhaust passage 27, as shown. This pneumatic pressure supplied to diaphragm piston 28 is modulated by the force motor transducer 16, so as to vary in direct proportion to current changes in control wire 15. As the force motor current increases, a bleed valve in the form of a ball valve 30, located in a vent branch of supply passage 29, is urged toward its seat to reduce the air bleed and thereby establish back pressure in passage 29 and at diaphragm piston 28 that increases as the force motor current increases. Conversely, a decrease in the force motor current allows this pressure under ball 30 to bleed off to atmosphere, thereby decreasing the back pressure in passage 29 and effective at diaphragm piston 28.

Pneumatic brake actuator 20 of brake blending unit 11 includes a diaphragm piston 31 subject to the output control pressure 14 supplied by pressure inverter 12 via pipe 14. As mentioned, this pressure inverter 12, in actual practice, may be a standard MC-30 control valve device which simply responds to a brake pipe pressure 13 change at its input and provides a control pressure 14 at its output in inverse proportion to the brake pipe pressure change, for example 2.5:1. Thus, a 20 psi reduction of pressure in brake pipe 9, for example, will result in a pressure increase to 50 psi in pipe 14 via which diaphragm piston 31 of the blending unit pneumatic brake actuator 20 is pressurized. Thus, rotation of handle 8 of brake valve device 7 from brake release position to full service position will concurrently cause the brake pipe pressure 9 and current in signal wire 10 to reduce, as mentioned, which will in turn result in the control pressure signal from the pneumatic inverter 12 output to increase from 0-50 psi and the output 40 from the electrical inverter 39 to increase from 0-500 ma. It will be understood that for reasons of safety, i.e., for fail-safe braking, it becomes necessary to perform the above-discussed inversion of both the pneumatic and electrical brake demand control signals. The pneumatic pressure signal corresponding to a given brake pipe pressure reduction urges diaphragm piston 31 and its push rod 32 in a downward direction. This downward force tends to rotate balance beam 21 in a counterclockwise direction about its fulcrum roller 22 to urge a push rod 33, associated with the spool valve assembly of self-lapping relay valve 17, in an upward direction toward application position.

This upward force acting on self-lapping relay valve 17 is opposed by the force of pressure acting on diaphragm piston 28 under control of force motor 16, as previously discussed. It will, therefore, be appreciated that so long as the force motor current is of such value as to establish back pressure at diaphragm piston 28 sufficient to nullify the force exerted by the pneumatic brake actuator 20 through balance beam 21, the spool valve assembly of self-lapping relay valve 17 will remain in release position. However, if the current at force motor 16 is insufficient to maintain a counteracting pressure force at diaphragm piston 28, the spool valve assembly of self-lapping relay valve 17 will be shifted upwardly to application position, in which the first supply valve passage 26 is connected to delivery passage 25. The resulting delivery pressure is connected via a pipe 34 to the friction brake unit 35 to initiate friction braking at the respective car. Concurrently, pressure in delivery passage 25 is connected to a feedback diaphragm piston 36 that also acts on the self-lapping spool valve assembly in opposition to the effective upward acting force exerted through balance beam 21. When these forces, including the force of small release spring 37 balance, the self-lapping spool valve assembly assumes its neutral or lap position in which further supply of delivery pressure to the friction brake unit 35 is terminated. Consequently, the friction brake pneumatic pressure is determined by the pneumatic force exerted through brake actuator 20, as reduced by the pneumatic force exerted through control of relay valve 17 by force motor 16. As will be seen from the following discussion, as long as the level of regenerative braking is sufficient to satisfy the brake demand according to a given handle position, so that no supplemental friction brake is required, the force motor current will be sufficient to nullify the pneumatic force of brake actuator 20, thereby preventing the SERVOTROL unit from developing any friction braking. As friction brake requirement increases, with loss of regenerative electric brake capability, the force motor current is reduced relative to the pneumatic pressure supplied to brake actuator 20, to allow the friction brake to develop in proportion to the loss of regenerative brake effort.

At the load actuator 19, pneumatic pressure from the car air spring 41 is connected to diaphragm piston 24 in order to position fulcrum roller 22 along balance beam 21 against the resistance of spring 23, thereby adjusting the lever ratio of balance beam 21 and thus the mechanical advantage with which the force motor current acts to counteract the pneumatic force of brake actuator 20. Control wire 15, via which the force motor current is supplied, leads through a pneumatic to electric transducer 38 on the non-power cars 2 and 3, which converts the car air spring pressure 41 to a corresponding electrical signal, whereby the force motor control current is also modified according to the car load condition, in order to counterbalance the load-adjusted force exerted by brake actuator 20. This arrangement provides a means of load-adjusting the friction brake pressure without interfering with the critical relationship between the pneumatic force acting on brake actuator 20 and the force motor current, in developing the desired friction brake force on the respective power and non-power cars.

In addition to the aforementioned apparatus, power cars 4 and 5 further include an armature control device 42 that selects the appropriate configuration of armature control windings for control of the car traction motors. The electric brake efficiency or, in other words, the regenerative ability of the traction motors, depends upon the power line voltage and/or the speed at which the motors are operating, becoming progressively lower as the line voltage increases or the speed decreases.

Figure 4C:
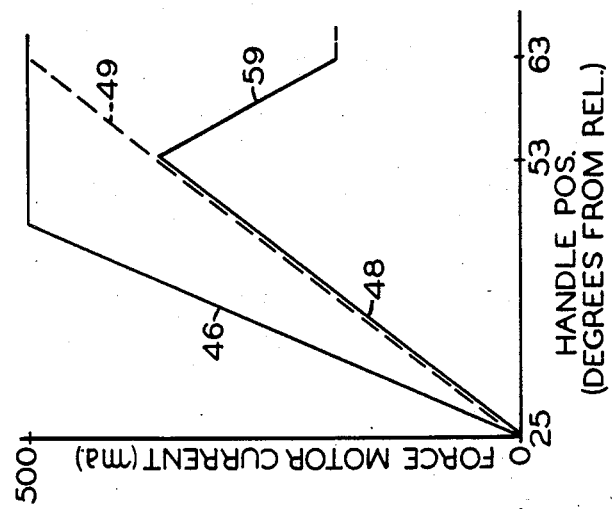
FIGS. 4b and 4c are graphs showing the relationship between the brake blending unit electrical control signal excursion at the power and non-power cars at 100% regenerative capability under tare load and full load conditions, respectively.
Figure 4B:
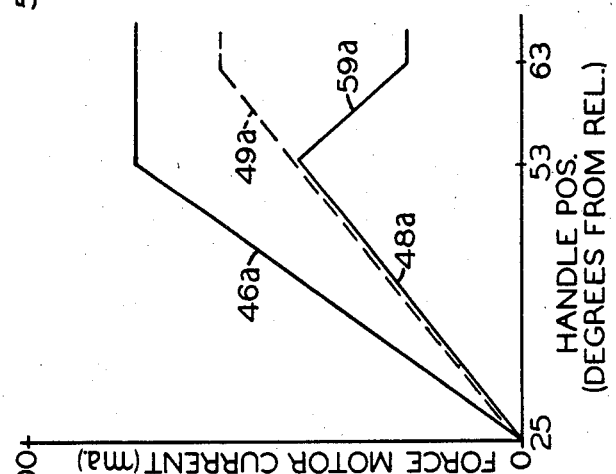

A feedback wire 44, from the traction motor armature, delivers a control current signal to the power car force motor 16 in direct proportion to armature current, which is then amplified through a multiplier circuit 43, for a purpose hereinafter explained. The resultant power car force motor control signal is represented by curve 46 which varies between 0 and 500 ma, as the brake valve handle is rotated from 25° to 63° corresponding to full release and full service positions, as shown in the graph of FIG. 4c. The maximum linear excursion of this signal 46 is cut off at the 500 ma. level by a limiter circuit represented by block 47 to prevent force motor overdrive and damage. This force motor control signal is connected to the force motor 16 of SERVOTROL unit 11 of the respective power cars 4 and 5 via wire 15.

Figure 4A:
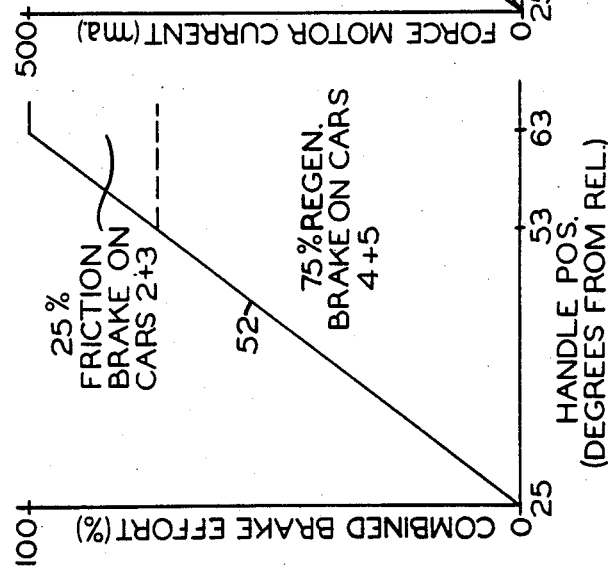
FIG. 4a is a graph showing how the total brake effort on the train of cars in FIG. 1 is apportioned between electro-dynamic and friction braking on the respective cars under conditions of 100% regeneration capability.

Referring now to the graph of FIG. 4a, it will be seen that the maximum available regeneration has been chosen to provide 75% of the total train brake effort or retardation. Thus, the remaining brake effort of 25%, which is within the maximum allowable level of friction braking, as determined by the energy absorption ability of the car wheels in accordance with the wheel thermal limitations, must be supplied by friction braking. The linear curve 52 in this graph represents the total brake demand for a given handle position of brake valve 7. It will be seen, from the graph of FIG. 4a, that the chosen maximum level of regeneration is developed when the brake valve handle is rotated to the 53° handle position. Since the friction brake on the non-power cars is intended to come on only after full regeneration is realized, it will be understood, therefore, that the force motor control current on the non-power car SERVOTROL units must begin to "ramp off" or decline to allow the friction brake to begin to apply precisely at the 53° handle position,or, in other words, immediately following full development of the electric brake. Since this corresponds to full regenerative brake, or 75% of the total train brake effort, the "ramp off" signal of curve 59 will occur at 375 ma., which is 75% of the 500 ma. excursion of brake demand curve 49.

In order to achieve the foregoing regulation of the nonpower car force motor control current, the inputs of a summing amplifier 50 are connected to feedback wires 44 via branch wires 51. The amplifier output is connected via a wire 53 to one input of a comparator 54. The other input of comparator 54 is connected to the output of another summing amplifier 55. The inputs of this amplifier 55 are connected to the load weighed output from the respective transducers 38 of power cars 4 and 5. The output of comparator 54 is the difference between the load-weighed regenerative brake demand and the actual level of regenerative brake effort in effect, and thus provides an indication of the percentage of regenerative brake demand being provided by the electro-dynamic brake. As long as the brake demand is being met, no output occurs at comparator 54, and as the brake demand exceeds the regenerative ability, the comparator output signal difference increases. This difference signal at the comparator output is fed to signal generator 56, via wire 57, together with the inverted brake demand signal from signal wire 40 via wire 58.

In response to these signals, circuit 56 generates the force motor control current for the non-power car SERVOTROL units 11. For example, in the absence of a difference signal at the output of comparator 54, signal generator 56 will produce an output signal at some fixed proportion of the brake demand signal. As a difference signal develops at the comparator, the comparator output will vary an inverse proportion to the brake demand signal. This output of signal generator 56 is the non-power car force motor control current signal, as represented in FIG. 4c by curve 48 during handle rotation up to the 53° position, and by a "ramp off" curve 59 between the 53° and 63° handle positions. The point at which curve 59 "ramps off" from curve 48 occurs in the handle position at which maximum regenerative braking is realized, i.e., where a difference signal at the output of comparator 54 first appears. At 100% regeneration, the graph of FIG. 4a shows this to occur in the 53° handle position. A limiter circuit 60 serves to cut off the decline of this force motor current at a predetermined level, e.g., 190 ma. in the full service handle position of 63°, thereby establishing the slope of curve 59.

Since the SERVOTROL units 11 respond to the excess of the pneumatic pressure signal at pneumatic actuator 20 relative to the force motor control current (as previously explained) and the pneumatic signal corresponds to the brake demand (as represented by curve 49 in the graph of FIG. 4c), it will be understood that the level of friction braking produced by the non-power car SERVOTROL units depends upon the difference between the amplitude of the brake demand signal (represented by curve 49) and the amplitude of the force motor current signal (represented by curve 48–59). Thus, below the 53° handle position, in which the regenerative brake is capable of satisfying the brake demand, curves 48 and 49 correspond and friction braking is essentially zero. However, as the "ramp off" curve 59 deviates from curve 49 between the 53° handle position and the 63° full service handle position, the force motor current becomes progressively less effective in counteracting the pneumatic signal at actuator 20 of the non-power car SERVOTROL units. This results in friction braking at a level that produces 25% of the total train retardation, as shown in the graph of FIG. 4c.

On the power cars, the signal at feedback wire 44 and thus the amplified signal at wire 15 leading to the force motor 16 of the power cars' SERVOTROL units 11, as represented by curve 46, reaches its cut-off limit of 500 ma. during 100% regeneration. Thus, the force motor signal exceeds the pneumatic control pressure at the SERVOTROL unit pneumatic actuator 20, represented by brake demand line 49 for any given handle position, to nullify the friction brake output on the power cars during 100% regeneration.

As the regenerative brake fades, it is intended that the friction brake effort increase proportionately until the maximum allowable percentage of train friction braking is obtained on the non-power cars, as determined by the energy absorption ability of the wheels with respect to a given thermal limit thereof. Since the slope of curve 59 is constant for a given car weight and begins to "ramp off" at different points along the brake demand line 49 in the graph of FIG. 4c, corresponding to the progressively lower percentage of available regenerative brake, it will be understood that the amount of friction braking progressively increases. This is due to the fact that the change in the "ramp off" point of curve 59 results in the current difference between curves 49 and 59 becoming increasingly greater for a given handle position, as the level of regeneration decreases, until the force motor control signal 59 becomes zero at the 63° handle position. This is clearly demonstrated by a comparison of the 76 available regeneration graph of FIG. 5c with the 100% available regeneration graph of FIG. 4c.

The friction braking obtained on the non-power cars reaches its maximum level at the 76% regenerative level, when the brake valve handle is rotated to the 63° full service position. This maximum friction braking level is dictated by the thermal limit of the wheels, as above explained, to provide 43% of the total train retardation, as indicated by the 76% regeneration graph of FIG. 5a. It is to be understood that the respective non-power cars 2 and 3 share equally in providing this 43% friction brake effort, while the maximum available total 76% regenerative brake effort on the power cars 4 and 5 provides the remaining 57% of the total train retardation.

Figure 5C:
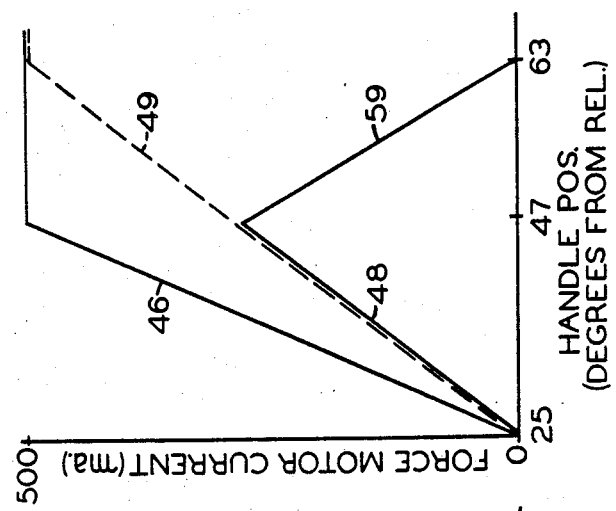
FIGS. 5b and 5c are graphs showing the relationship between the brake blending unit control signal excursion at the power and non-power cars at 77% regenerative capability under tare load and full load conditions, respectively.
Figure 5B:
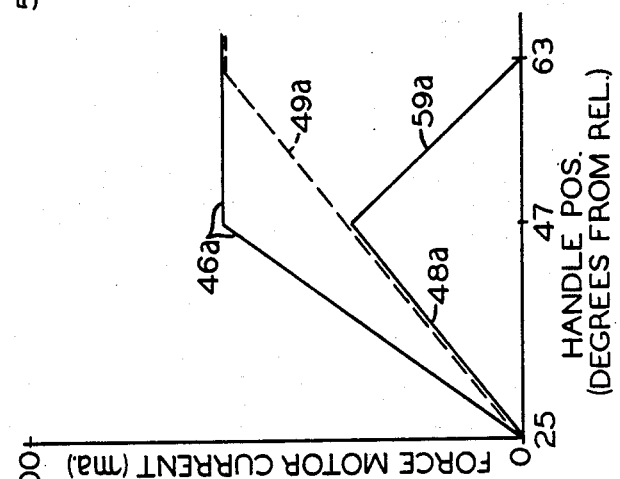
Figure 5A:
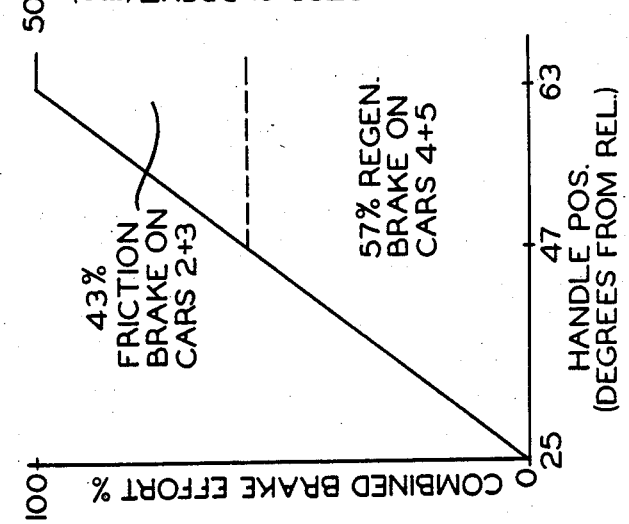
FIG. 5a is a graph showing how the total brake effort on the train of cars in FIG. 1 is apportioned between electro-dynamic and friction braking on the respective cars when maximum friction braking has been provided at the non-power cars. This condition corresponds to 77% regenerative capability.

It should also be noted, at this point, that the friction brake on the power cars 4 and 5 continues to be held off in the range between 100% and 76% available regeneration, since, as can be seen in the 76% graph of FIG. 5c, as in the 100% graph of FIG. 4c the amplitude of the force motor current signal represented by curve 46 exceeds the amplitude of the brake demand signal represented by curve 49 in all handle positions.

Since the friction brake effort on the non-powered cars is continuously regulated, as required to supplement the fading regenerative brake to the extent that the total train brake effort is maintained at 100% of the brake demand, it will be realized that the train rate of retardation is held constant for any given brake level demand, even as the electric/friction brake values fluctuate between cars.

At available regenerative levels below 76%, the maximum friction brake effort on the non-power cars is insufficient to further supplement the electric regenerative brake to the extent necessary to provide braking effort at 100% of the brake demand. Thus, it becomes necessary to make up the shortfall by adding friction braking on the power cars, in addition to the non-power cars. The 50% regenerative graph of FIG. 6c will illustrate how this is accomplished.

As previously mentioned, the point at which curve 59 "ramps off" from curve 48 occurs in the handle position at which maximum regenerative braking is realized. This is determined by the signal generator 56 in response to the comparator output signal via wire 57 and the brake demand signal (handle position) via wire 58, and is shown by the 50% available regeneration graph of FIG. 6a to occur at the 39° handle position. Since the slope of curve 59 is constant, it will be seen that "ramp off" curve 59 in the graph of FIG. 6c reaches zero current level in the 49° handle position. Thus, maximum electric regenerative braking is reached at the 39° handle position, and between the 39° and 49° handle positions, the friction brake is increased proportionally on the non-power cars. When the non-powered car force motor current signal reaches zero at the 49° handle position, it will be noted that maximum percentage of friction braking contribution from the non-powered cars has been reached, since the friction brake level of these cars is determined by the brake pipe reduction. Further, brake pipe reductions will produce increases in non-powered car braking effort proportional to brake demand, keeping the contribution percentage constant.

At this point, corresponding to the 49° handle position, supplemental friction braking begins to develop on the power cars. This is brought about by the fact that, during motor regeneration at levels below the 76% level, the level of motor regeneration is monitored by feedback wire 44. Thus, curve 46, which represents the amplified output of this feedback signal is useful in delaying the powered cars' friction brake until the non-powered cars' friction brake has fully developed. It will, therefore, be understood that by properly selecting the multiplication factor by which the feedback signal is amplified, this signal will be the same as the brake demand signal at the precise handle position in which the non-power car force motor signal reaches 0 amps. This will be seen to occur in the 49° handle position, in the graph of FIG. 6a, where curve 46 intersects brake demand line 49 and curve 48–59 reaches 0 amps at the same handle position of 49°. This means the power car force motor control current and the pneumatic brake control signal difference progressively increases through the 49°–63° range of handle positions to bring on the power car friction brake.

It will be apparent, therefore, that between the 49° and 63° handle positions, the addition of friction braking to the power cars during available regeneration below the 76% range, along with non-powered car friction brake, will provide a total train brake effort equal to 100% of the requirement for a given brake demand.

The graphs of FIG. 7 show that, in the absence of any regenerative brake effort whatsoever, the force motor current to the SERVOTROL units 11 of both power and non-power cars alike will become zero, thereby leaving the pneumatic control signal at the SERVOTROL pneumatic brake actuator 20 capable of producing pneumatic brake pressure unmitigated by the counteracting effect of force motors 16. Accordingly, full friction brake effort is produced by the respective SERVOTROL units, which corresponds to 21.5% of the total brake effort on each non-power car 2 and 3, for a combined total of 43% friction brake effort, and 28.5% of each power car 4 and 5, for a combined total of 57% regenerative brake effort. These percentages of the total brake effort are achieved by friction braking on the respective power and non-power cars up to the maximum level allowable, and represent the individual car's requirement to decelerate its own weight at the train deceleration rate.

In the graphs of FIGS. 4b–7b, the respective signal levels are shown for an empty or tare load, as opposed to the signal levels for a full or crush-loaded car shown in the graphs of FIGS. 4c–7c. Although these tare load signals change in proportion to car load, they are formed in the same manner and thus need not be discussed further. The corresponding curves in the respective tare load graphs are identified by a suffix letter (a).

We claim:

1. A cross-blending brake system for a train of cars including at least one power car having electro-dynamic brake means therefor and at least one non-power car comprising:
    (a) a brake pipe extending continuously through said train of cars in which fluid under pressure is carried;
    (b) a signal wire extending continuously through said train of cars in which an electrical current is carried;
    (c) a brake valve device including a control handle rotatable in a brake application range between full release and full service brake positions to effect a corresponding variation in the level of said brake pipe fluid pressure and said signal wire current, said brake pipe fluid pressure providing an analog fluid pressure brake demand signal, and said signal wire current providing an analog electric brake demand signal to control said electro-dynamic brake means in accordance with the desired rate of train retardation;
    (d) means for providing a feedback signal corresponding to the regenerative current of said electro-dynamic brake means;
    (e) means for providing a first control signal, the value of which is the same as the value of said electric brake demand signal when said feedback signal corresponds to said electric brake demand signal and is less than the value of said electric brake demand signal by an amount proportional to the difference between said electric brake demand signal and said feedback signal when said electric brake demand signal exceeds said feedback signal;
    (f) a fluid-pressure-operated brake unit on said at least one power car and on said at least one non-power car;
    (g) first blending valve means including first and second motor means subject respectively to said fluid brake demand signal and to said first control signal for producing a differential force in response to which said non-power car brake unit is operated to provide friction braking thereat when said differential force occurs as a result of the force exerted by said first motor means being greater than the force exerted by said second motor means;
    (h) means for amplifying said feedback signal to provide a second control signal; and (i) second blending valve means including third and fourth motor means subject respectively to said fluid pressure brake demand signal, and to said second control signal for producing a differential force in response to which said power car brake unit is operated to provide friction braking thereat when said differential force occurs as a result of the force exerted by said third motor means being greater than the force exerted by said fourth motor means.

2. A cross blending brake system, as recited in claim 1, wherein the level of said first control signal is zero in said full service position of said brake valve handle when said electro-dynamic brake means is operating at a predetermined level of regeneration.

3. A cross blending brake system, as recited in claim 2, wherein said predetermined level of regeneration is 76% of full regeneration.

4. A cross blending brake system, as recited in claim 2, wherein the slope of said first control signal when said electric brake demand signal exceeds said feedback signal remains constant for any level of regeneration.

5. A cross blending brake system, as recited in claim 4, wherein said amplification of said feedback signal to provide said second control signal is by a factor selected such that said second control signal becomes less than said electric brake demand signal in a position of said brake valve handle in which the level of said first control signal becomes zero, except when the level of regeneration is greater than said predetermined level.

6. A cross blending brake system, as recited in claim 5, further comprising limit means for maintaining said first control signal constant at proportionally higher values above zero, as the level of regeneration of said electro-dynamic brake means varies between said predetermined level and 100% in said full service position of said brake valve handle and beyond.

7. A cross blending brake system, as recited in claim 2, wherein said means for providing said first control signal comprises:
  (a) a comparator having a first input subject to said feedback signal, a second input subject to said electric brake demand signal, and an output providing a difference signal corresponding to the difference between said signals at said first and second inputs; and
  (b) a signal generator having a first input subject to said electric brake demand signal, a second input subject to said difference signal, and an output providing said first control signal so as to match said electric brake demand signal when said feedback signal is equal to said electric brake demand signal and so as to vary in inverse proportion to said electric brake demand signal in accordance with said difference signal when inequality exists between said electric brake demand signal and said feedback signal.

8. A cross blending brake system, as recited in claim 1, further comprising limit means for preventing said second control signal from exceeding said electric brake demand signal in said full service position of said brake valve handle and beyond.

9. A cross blending brake system, as recited in claim 1, further comprising:
  (a) a first load responsive means for modifying said electric brake demand signal according to the load condition of said at least one power car whereby said second control signal accordingly modifies the effect of said fourth motor means on said force differential produced at said second blending valve means;
  (b) said second blending valve means including second load responsive means for modifying the effect of said third motor means thereof on said force differential according to the load condition of said power car to balance the effect of said fourth motor means thereof whereby said force differential controlling said brake unit of said power car reflects the load condition thereof; and
  (c) third load responsive means for modifying said first control signal according to the load condition of said at least one non-power car to modify the effect of said second motor means on said force differential produced at said first blending valve means; and
  (d) said first blending valve means including first load responsive means for modifying the effect of said fluid pressure motor thereof on said force differential according to the load condition of said at least one non-power car to balance the effect of said second motor means thereof, whereby said force differential controlling said brake unit of said non-power car reflects the load condition thereof.

10. A cross blending brake system, as recited in claim 7, wherein said at least one power car includes first and second power cars, comprising:
  (a) first summing means having first and second inputs subject respectively to said feedback signal of said first power car and to said feedback signal of said second power car and an output connected to said first input of said comparator; and
  (b) second summing means having first and second inputs subject respectively to said electric brake demand signal of said first power car and to said electric brake demand signal of said second power car and an output connected to said second input of said comparator.

11. A cross blending brake system, as recited in claim 1, further comprising:
  (a) first inverter means for providing said fluid pressure brake demand signal in inverse relationship to said brake pipe fluid pressure; and
  (b) second inverter means for providing said electric brake demand signal in inverse relationship to said signal pipe current level.

12. A cross blending brake system, as recited in claim 1, wherein said first blending valve means operates said brake unit of said non-power car in said full service position of said brake valve handle to provide a maximum allowable level of friction braking thereon during a zero level of regeneration of said electro-dynamic brake means in response to the absence of said second control signal at said second motor means of said first blending valve means, said maximum allowable level of friction braking being such as to establish a rate of retardation of said non-power car equal to a rate of train retardation corresponding to said full service position of said brake valve handle.

13. A cross blending brake system, as recited in claim 1, wherein said second blending valve means operates said brake unit of said power car in said full service position of said brake valve handle to provide a maximum level of friction braking thereon during a zero level of regeneration of said electro-dynamic brake means in response to the absence of said second control signal at said fourth motor means of said second blending valve means, said maximum friction brake level being such as to effect a rate of retardation of said at least one power car equal to a rate of train retardation corresponding to said full service position of said brake valve handle.

* * * * *